United States Patent
Stachowiak, Jr.

(10) Patent No.: US 11,091,980 B2
(45) Date of Patent: Aug. 17, 2021

(54) STREAMLINED VALVE ASSEMBLY FOR DOWNHOLE PUMP OF RECIPROCATING PUMP SYSTEM

(71) Applicant: Weatherford Technology Holdings, LLC, Houston, TX (US)

(72) Inventor: John E. Stachowiak, Jr., Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 298 days.

(21) Appl. No.: 16/026,400

(22) Filed: Jul. 3, 2018

(65) Prior Publication Data

US 2020/0011154 A1   Jan. 9, 2020

(51) Int. Cl.
*E21B 34/08* (2006.01)
*F16K 15/04* (2006.01)
*F04B 53/10* (2006.01)

(52) U.S. Cl.
CPC .......... *E21B 34/08* (2013.01); *F04B 53/1007* (2013.01); *F16K 15/04* (2013.01)

(58) Field of Classification Search
CPC ........ F16K 15/04; F16K 15/02; F04B 19/003; F04B 47/02; F04B 47/022; F04B 53/1007; F04B 53/101; F04B 53/1012; E21B 34/08; E21B 43/17
See application file for complete search history.

(56) References Cited

U.S. PATENT DOCUMENTS

| | | | |
|---|---|---|---|
| 751,758 A * | 2/1904 | Small | F16K 15/04 137/533.13 |
| 2,002,483 A | 5/1935 | Long | |
| 2,061,480 A | 11/1936 | Pigott | |
| 2,274,968 A * | 3/1942 | O'Bannon | F16K 15/04 137/515.7 |
| 2,294,568 A * | 9/1942 | Neilsen | F04B 53/101 137/515.7 |
| 2,898,128 A | 8/1959 | Shohan | |
| 3,593,343 A | 7/1971 | Viggers | |
| 3,776,258 A | 12/1973 | Dockins, Jr. | |
| 3,990,472 A | 11/1976 | Etes | |
| 4,361,420 A | 11/1982 | Bell | |
| 5,195,552 A | 3/1993 | Nehm | |
| 5,507,312 A | 4/1996 | Dillman | |
| 6,007,314 A | 12/1999 | Nelson, II | |
| 6,029,685 A | 2/2000 | Carruth | |

(Continued)

FOREIGN PATENT DOCUMENTS

RU    2382926 C2    11/2007
RU    112293 U1    6/2011

*Primary Examiner* — Bryan M Lettman
(74) *Attorney, Agent, or Firm* — Blank Rome LLP

(57) ABSTRACT

A downhole pump used for a reciprocating pump system includes a barrel coupling to a tubing string and having a standing valve and includes a plunger coupling to a rod string and having a traveling valve. One or both of the valves can include an assembly comprising a housing, an insert, a ball, and a seat. The insert allowing for flow therethrough defines a ball stop at one end has a ball passage at the other end. The insert positions in flow passage of the housing, and one of the ends engages a shoulder in the passage. The insert includes sidewalls and a conical body to reduce turbulence, flow velocity, gas breakout, ball chatter, and the like.

25 Claims, 11 Drawing Sheets

(56) References Cited

U.S. PATENT DOCUMENTS

| | | | | |
|---|---|---|---|---|
| 6,685,451 B1* | 2/2004 | Ivey | ........................ | F04B 47/02 137/533.19 |
| 2005/0257927 A1* | 11/2005 | Coyes | ..................... | F04B 47/02 166/108 |
| 2010/0269928 A1* | 10/2010 | Ford | ....................... | F16K 15/04 137/533.11 |

\* cited by examiner

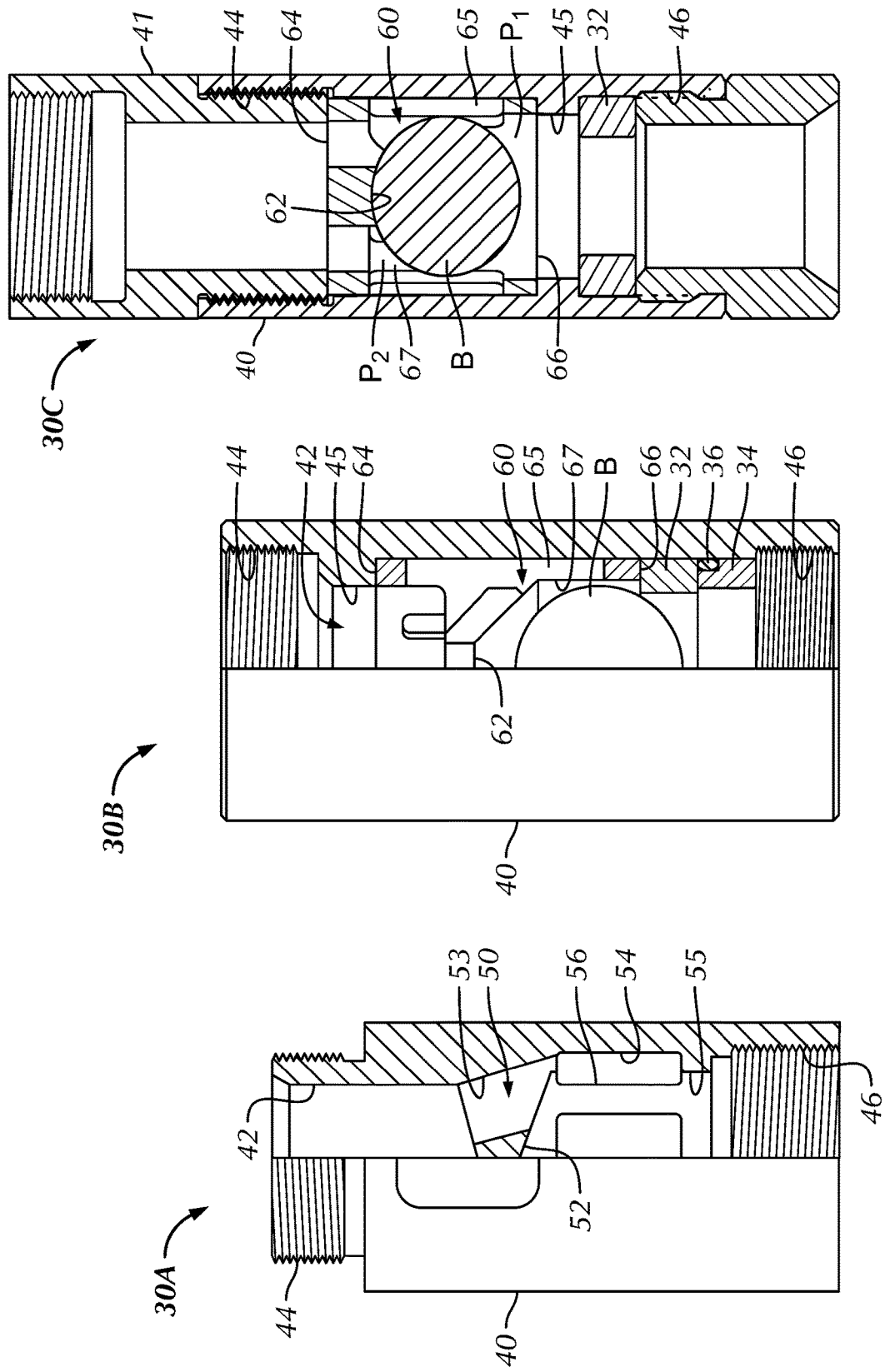

STREAMLINED VALVE ASSEMBLY FOR DOWNHOLE PUMP OF RECIPROCATING PUMP SYSTEM

BACKGROUND OF THE DISCLOSURE

Reciprocating pump systems, such as sucker rod pump systems, extract fluids from a well and employ a downhole pump connected to a driving source at the surface. A rod string connects the surface driving force to the downhole pump in the well. The downhole pump is a positive displacement pump that utilizes a standing valve and a travelling valve. The valves comprise a floating check ball, a ball seat, and a cage body that incorporates both a ball stop and ball guides. When operated, the driving source cyclically raises and lowers the downhole plunger, and with each stroke, the downhole pump lifts well fluids toward the surface.

For example, FIG. 1 shows a sucker rod pump system 10 used to produce fluid from a well. A downhole pump 14 has a barrel 16 with a standing valve 24 located at the bottom. The standing valve 24 allows fluid to enter from the wellbore, but does not allow the fluid to leave. Inside the pump barrel 16, a plunger 20 has a traveling valve 22, which allows fluid to move from below the plunger 20 to the production tubing 18 above, but does not allow fluid to return from the tubing 18 to the pump barrel 16 below the plunger 20. A driving source (e.g., a pump jack or pumping unit 26) at the surface connects by a rod string 12 to the plunger 20 and moves the plunger 20 up and down cyclically in upstrokes and downstrokes to lift fluid to the surface.

Various types of valve assemblies have been used for the standing and traveling valves of a downhole pump. For example, FIG. 2A illustrates a one-piece valve assembly 30A according to the prior art, which can be used for a standing valve or a traveling valve of a downhole pump. The assembly 30A includes a housing 40 having uphole and downhole ends 44 and 46 with a flow passage 42 therethrough. The ends 44 and 46 have threads for threading to other components of a pump system. An internal cage 50 is integrally machined inside the flow passage 42. A ball (not shown) inserts in the internal cage 50, and a seat (not shown) inserts in the flow passage 42 to engage an internal shoulder 55. A pin-threaded component can then thread to the thread at the housing's downhole end 46 to retain the seat and ball in the cage 50.

The cage 50 includes a stop 52 to stop the ball. Flow through the stop 52 is simply provided by cylindrical holes 53 milled through the stop 52. The cage 50 also includes flutes 54 milled in the side of the flow passage 42 that allow flow to pass by the ball when engaged with the stop 52. Axial rails or ball guides 56 between the flutes 54 provide support for the ball in its movement.

Being integral, the housing 40 and internal cage 50 are composed of the same material. In many cases, they are made of a stainless steel, a nickel-copper alloy, MONEL® metal, or the like. (MONEL is a registered trademark of HUNTINGTON ALLOYS CORPORATION.) It is common to line the rails 56 and even the stop with 52 with a cobalt-chromium alloy, such as a STELLITE® material, to provide hardness for supporting and engaging the ball. (STELLITE is a registered trademark of KENNAMETAL INC.) A welding process, such as tungsten inert gas (TIG) welding, is used to line the hardening alloy on the surfaces, which can be complicated.

Rather than a one-piece assembly, multi-piece assemblies can be used. For example, FIG. 2B illustrates one type of multi-piece valve assembly 30B according to the prior art, which can be used for a standing valve or a traveling valve of the downhole pump. Again, the assembly 30B includes a housing 40 having uphole and downhole ends 44 and 46 with a flow passage 42 therethrough. The ends 44 and 46 have threads for threading to other components of a pump system.

An insert 60 is separately machined and inserted inside the flow passage 42 to engage its upper end 64 against a shoulder 45. A ball B inserts in the insert 60, and a seat 32 inserts in the flow passage 42 to engage the lower end 66 of the insert 60 and contain the ball B. To provide sealing, a spacer 34 with a seal 36 fits against the seat 32. A pin-threaded component can then thread to the downhole end 46 to retain the spacer 34, the seat 32, the ball B, and the insert 60 in the housing 40.

The insert 60 includes a stop 62 to stop the ball B and includes flutes 65 in the flow passage 42 that allow flow to pass the ball B when engaged with the stop 62. Axial rails or ball guides 67 between the flutes 65 provide support for the ball B in its movement. Because the insert 60 is a separate component, it can be made of a different material than the housing 40 and can be made, for example, of a STELLITE® material.

The components of the insert 60, the seat 32, and the spacer 34 are all sandwiched against the shoulder 45 by the threading of an adapter (not shown) at the housing's downhole end 46. This can produce compressive load on the insert 60, which can lead to distortion and failure. For this reason, this insert 60 has an increased wall thickness to handle the compressive load, which requires the assembly 30B to be used with a ball B smaller than a standard API-sized ball.

FIG. 2C illustrates another type of multi-piece valve assembly 30C according to the prior art, which can be used for a standing valve or a traveling valve of the downhole pump. This assembly 30C is for use with a standard API-sized ball B. Again, the assembly 30C includes a housing 40 having uphole and downhole ends 44 and 46 with a flow passage 42 therethrough. The ends 44 and 46 have threads for threading to other components of a pump system.

An insert 60 is separately machined and inserted inside the flow passage 42 to engage its lower end 66 against a shoulder 45. To retain the insert 60 and provide sealing, a gasket (not shown) can be placed on the upper end 64 of the insert 60, and an adapter 41 of the housing 40 threads to the uphole threads 44. To complete the assembly, a ball B inserts in the insert 60, and a seat 32 inserts in the flow passage 42 to engage the shoulder 45. A pin-threaded component 43 can then thread at the housing's downhole end 46 to retain the seat 32 and ball B in the housing 40.

The insert 60 includes a stop 62 to stop the ball B and includes flutes 65 in the flow passage 42 that allow flow to pass the ball B when engaged with the stop 62. Axial rails 67 between the flutes 65 provide support for the ball B. Because the insert 60 is a separate component, it can be made of a different material than the housing 40 and can be made, for example, of a STELLITE® material.

As fluid flow begins to flow past the ball seat (32) in each of these types of cage bodies of FIGS. 2A-2C, the floating check ball (B) is halted by the ball stop (52, 62), limiting further axial travel. The fluid then continues to flow around the ball B, and subsequently across the ball stop (52, 62).

In a typical design, the valve assembly 30A-C is configured for "full flow" under the premise that greater flow area in the stop (52, 62) after the ball B means better flow for the valve. For this reasons, the ball stop (52, 62) is designed to allow for the greatest flow area possible once the fluid flows past the ball B. Because the smallest flow area (and highest velocity) occurs at the centerline (transverse plane) of the ball B and because the area past this point is much larger with typically a torturous fluid path, there is high turbulence that can cause ball chatter, cage wear, and potential gas breakout (gas entrained in the production fluid may come out of solution).

For example, the flow around the ball B in the insert 60 as in FIG. 2C becomes turbulent at $P_2$, and a pressure drop occurs at pinch points $P_1$, $P_2$. The flow also reaches higher velocities, which can lead to gas breakout. Although the pressure drop may not actually be that large (between 2 to 6 psi, for example), the pressure drop can also add to issues of gas breakout.

The subject matter of the present disclosure is directed to overcoming, or at least reducing the effects of, one or more of the problems set forth above.

SUMMARY OF THE DISCLOSURE

According to the present disclosure, a valve assembly is used with a floating check ball for a downhole pump. The assembly comprises a housing, an insert, and a conical body. The housing is disposed on the pump and defines a bore therethrough. The insert having first and second ends is disposed in the bore of the housing. The insert defines a flow passage therethrough, which defines a plurality of flutes in a sidewall of the insert.

The conical body of the insert is disposed in the flow passage and is affixed at at least one point to the sidewall. The conical body comprises: a base facing the first end for engaging the floating check ball, a tip extending away from the base toward the second end of the insert, and a conical side tapering from the base to the tip. The sidewall of the insert converges in a first conical passage from a wider dimension adjacent the base of the conical body to a narrower dimension adjacent the tip.

The base of the conical body can define a semi-spherical surface, such as suited for the spherical floating check ball. The conical side of the conical body tapering from the base to the tip can in fact be oriented to be tangential to the spherical surface of the floating check ball engaged against the semi-spherical surface of the base.

The insert can comprise a plurality of rails disposed between the flutes in the sidewall of the insert. For their part, the flutes in the sidewall of the insert can open the flow passage external to the insert so that the inner wall of the housing can define part of the flow passage through the valve assembly.

The first conical passage of the sidewall can diverge outward relative to the conical side of the conical body from the base toward the tip. For example, the first conical passage can diverge non-linearly outward.

The first end of the insert can comprise a ring defining a ball opening for passage of the floating check ball. This ring can define a second diameter at least as great as a first diameter of the floating check ball. The ring can flare outward at the flutes in the sidewall of the insert.

The sidewall of the insert can diverge at a transition from the first conical passage away from the tip of the conical body in a second conical passage. This second conical passage can be inverted from the first conical passage and opening at the second end of the insert.

The flow passage at the second end can define a second diameter at least as great as a third diameter of the base of the conical body. The second and third diameters can be less than a first diameter of the ball.

The base of the conical body can define a first port communicating with one or more second ports in the conical body. These ports may create a low pressure area behind the seated check ball, further assisting in its engagement against the conical body.

The housing of the valve assembly can incorporated into other components in a number of ways. For example, one end of the housing can define first threads for threading to a first component of the downhole pump, and another end of the housing defines second threads for threading to a second component of the downhole pump.

The assembly can further comprise a ball seat disposed in the bore of the housing adjacent the first end of the insert. In this way, the floating check ball can be movably disposed in the bore of the housing, engagable with the base of the conical body, passable at least partially through the ball passage of the insert, and seatable in the ball seat. Depending on the configuration of the housing, the ball seat can abut against the first end of the insert or can abut against an opposite side of a shoulder against which the first end of the insert abuts.

The insert as disclosed above can be a separate component of the housing or can be an integral component of the housing. For example, according to the present disclosure, a valve assembly used with a floating check ball for a downhole pump comprises a housing disposed on the pump. The housing has first and second ends and defines a bore therethrough. Flutes are disposed toward the first end of the housing and are defined in a sidewall of the bore of the housing. A conical body is disposed in the bore toward the second end and is affixed at at least one point to the sidewall of the housing. The conical body comprises: a base facing the first end for engaging the floating check ball, a tip extending away from the base toward the second end of the insert, and a conical side tapering from the base to the tip. The sidewall of the housing converges in a first conical passage from a wider dimension adjacent the base of the conical body to a narrower dimension adjacent the tip. Such a valve assembly can include each of the previously described features.

According to the present disclosure, a downhole pump is disclosed for a reciprocating pump system having a rod string disposed in a tubing string. The pump comprises: a barrel disposed in the tubing string; and a plunger coupled to the rod string. The barrel has a standing valve, and the plunger has a traveling valve and is movably disposed in the barrel. At least one of the standing and traveling valves uses a floating check ball and a ball seat and comprises a valve assembly according to any of the various features described above.

The foregoing summary is not intended to summarize each potential embodiment or every aspect of the present disclosure.

BRIEF DESCRIPTION OF THE DRAWINGS

FIG. 2A illustrates a one-piece valve assembly according to the prior art.

FIG. 2B illustrates one type of multi-piece valve assembly according to the prior art.

FIG. 2C illustrates another type of multi-piece valve assembly according to the prior art.

DETAILED DESCRIPTION OF THE DISCLOSURE

Figure 1A:
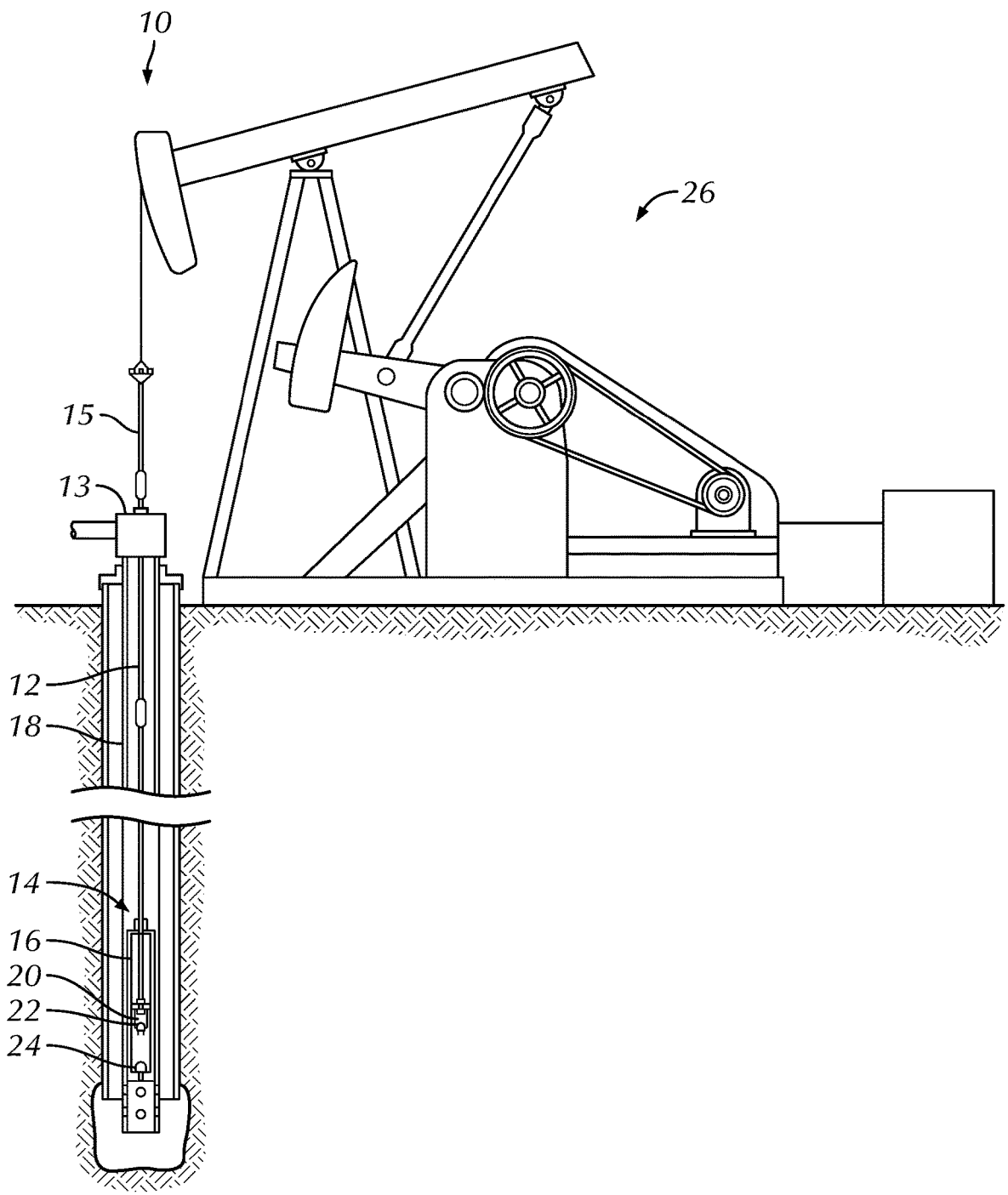
FIG. 1 illustrates an example of a reciprocating rod pump system known in the art.
Figure 3:
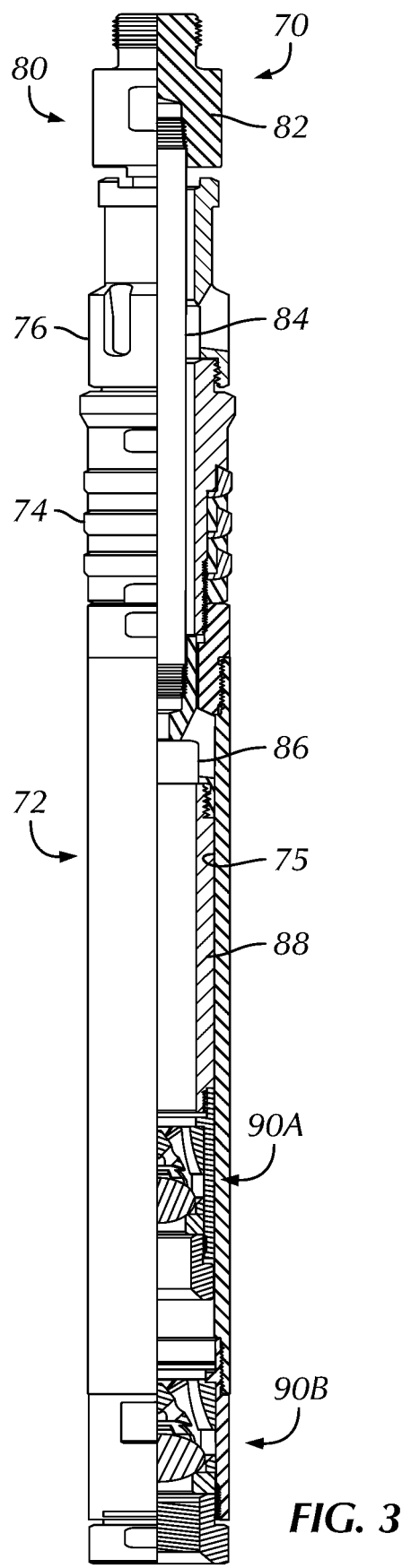
FIG. 3 illustrates a downhole pump of a reciprocating pump system according to the presented disclosure.

FIG. 3 illustrates a downhole pump 70 of a reciprocating pump system according to the presented disclosure, such as the system of FIG. 1. The downhole pump 70 has a stationary assembly having a barrel 72 connected to a seating assembly 74 and a top outlet 76. Various types of seating assemblies 74 can be used, and the one shown is only provided as an example. A standing valve 90B is located at the bottom of the barrel 72. The standing valve 90B, which includes a cage, a ball, and a seat, allows fluid to enter the barrel 72 from a wellbore, but does not allow the fluid to leave.

A plunger assembly 80 connects at a coupling 82 to a rod string (not shown) used for reciprocating the traveling assembly 80. A rod 84 extends from the coupling 82 to a ported coupling 86 connected to a plunger 88, which is movably disposed in the barrel's internal chamber 75. The plunger 88 has a traveling valve 90A, which includes a cage, a ball, and a seat. The traveling valve 90A allows fluid to enter from below the plunger 88, but does not allow fluid to leave.

As will be appreciated, the lengths of the barrel 72, the rod 84, the plunger 88 and the like are not shown to relative scale in FIG. 3 representative of the stroke of the pump 70. In any event, during the upstroke, the traveling valve 90A is closed, and any fluid above the plunger 88 is lifted towards the outlet 76. Meanwhile, the standing valve 90B opens and allows fluid to enter the pump barrel 72 from the wellbore. During the downstroke, the traveling valve 90A is opened, and the standing valve 90B closes. Previously drawn fluid in the barrel 72 can then enter through the traveling valve 90A to above the plunger 88.

The traveling valve 90A and/or the standing valve 90B use a valve assembly according to the present disclosure. Several configurations for the valve assemblies are disclosed below.

Figure 4A:
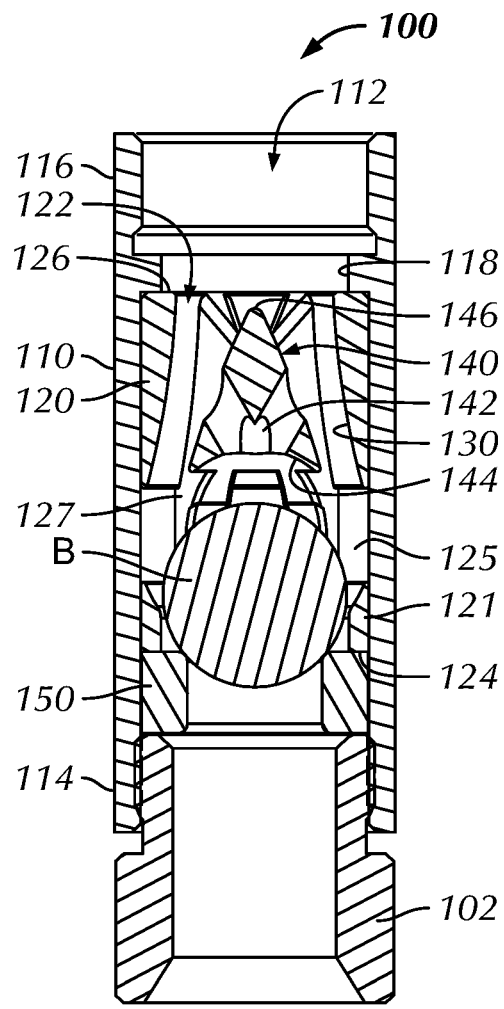
FIGS. 4A-4C illustrate different sectional views of a valve assembly for the downhole pump of FIG. 3 in closed and opened states.
Figure 4B:
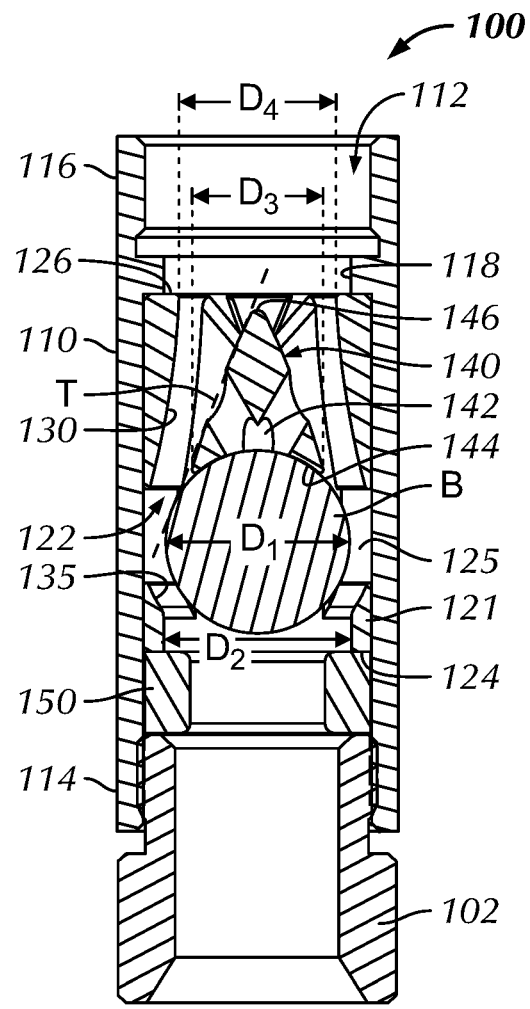
Figure 4C:
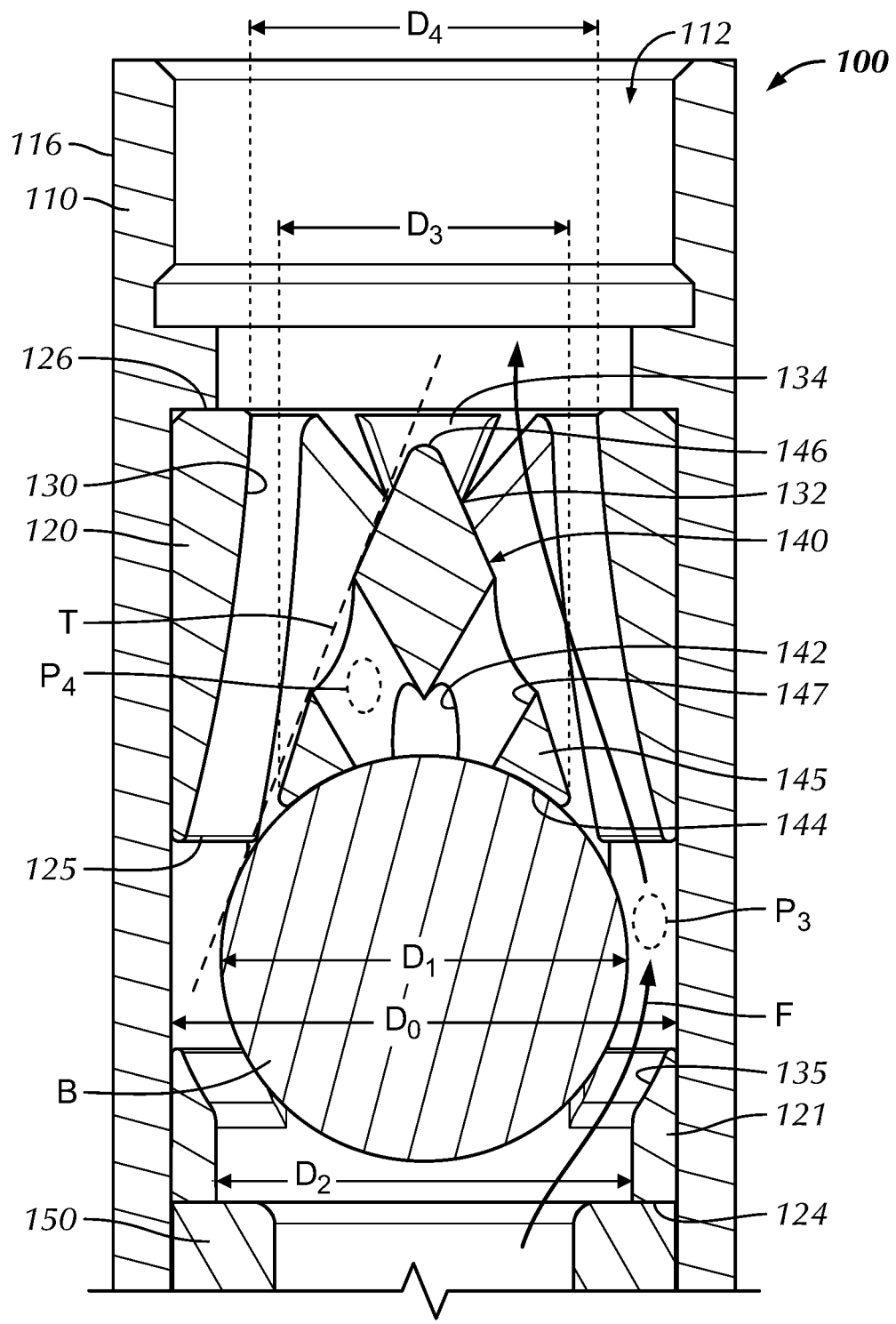

Turning to FIGS. 4A-4C, different cross-sectional views of a valve assembly 100 for the downhole pump of FIG. 3 are shown in closed and opened states. As shown, FIG. 4A shows the valve assembly 100 in a closed state, while FIG. 4B shows the valve assembly 100 in an opened state. FIG. 4C is a close-up view of the assembly 100 as depicted in the FIG. 4B.

The valve assembly 100 includes a housing 110, a cage insert 120, a floating check ball B, and a seat 150. The housing 110 has first and second ends 114, 116 and defines a flow bore 112 therethrough. Internally, the flow bore 112 defines a shoulder 118 between the ends 114, 116. As is typical, the ends 114, 116 have threads for threading to other components of the pump assembly. As shown here, the ends 114, 116 include box threads, but either one or both could be pin threads depending on the location of the valve assembly 100 on the downhole pump.

The cage insert 120 has ends 124, 126 with a flow passage 122 allowing for flow therethrough. As described in more detail below, the upper end 126 defines a ball stop in the form of a conical body 140 for engaging the floating check ball B. The lower end 124 defines a ball passage in the form of a ring 121 for passage of the ball B to the seat 150.

At least one of the ends 124, 126 engages the shoulder 118, which in this case is the upper end 126. The ball seat 150 is disposed in the bore 112 of the housing 110 adjacent the lower end 124 of the insert 120. The floating check ball B is movably disposed in the bore 112 of the housing 110, is engagable with the ball stop body 140 of the insert 120 (FIG. 4B), is passable at least partially through the ball passage 122 of the insert 120, and is seatable in the ball seat 150 (FIG. 4A).

Depending on the configuration, the ball seat 150 can abut against the lower end 124 of the insert 120 or can abut against an opposite side of a shoulder 118 against which the lower end 124 of the insert abuts. Here, the seat 150 inserts against the lower end 124 of the insert 120 and is held in place by an adapter 102 threaded to the thread of the downhole end 114 of the housing 110.

Figure 5A:
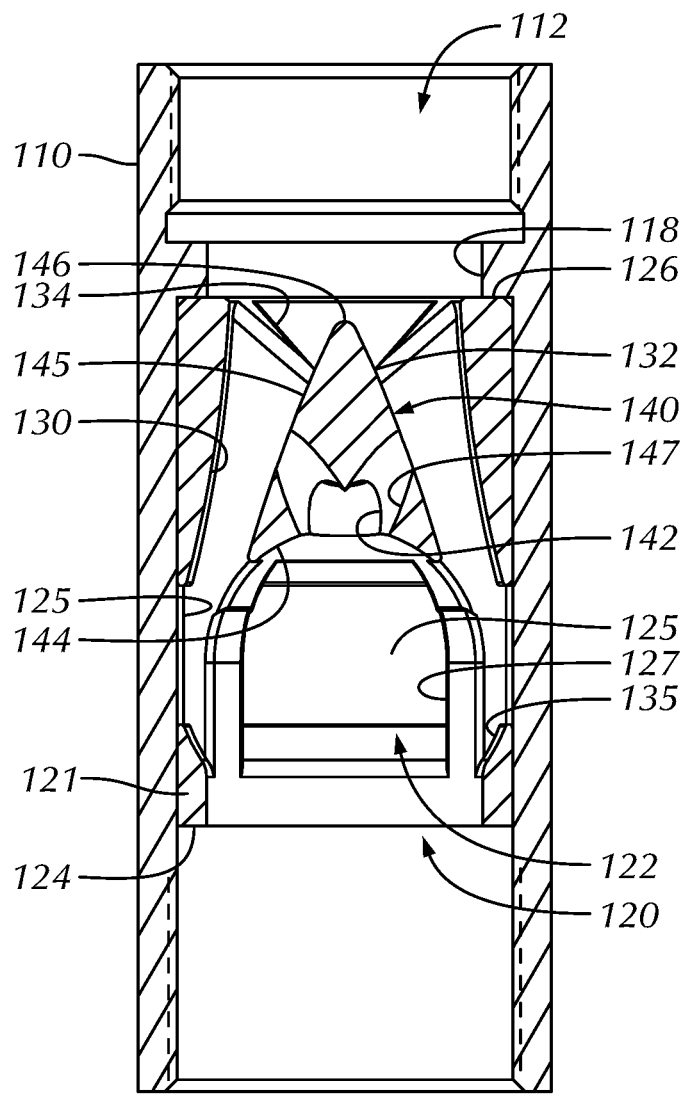
FIGS. 5A-5D illustrate first cross-sectional, top, bottom, and second cross-sectional views of an insert for the valve assembly.
Figure 5B:
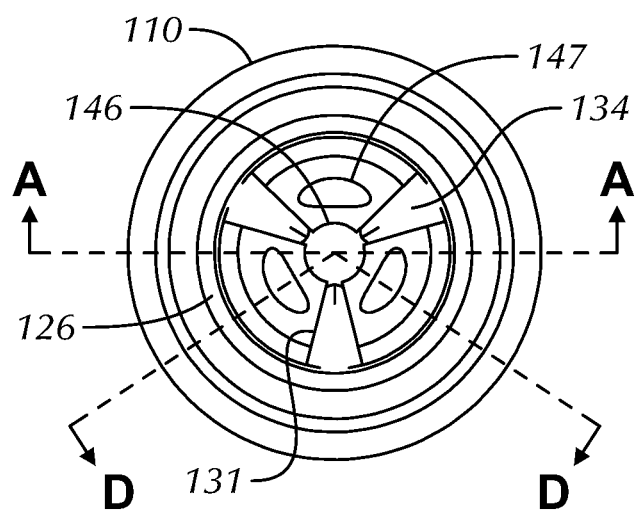
Figure 5C:
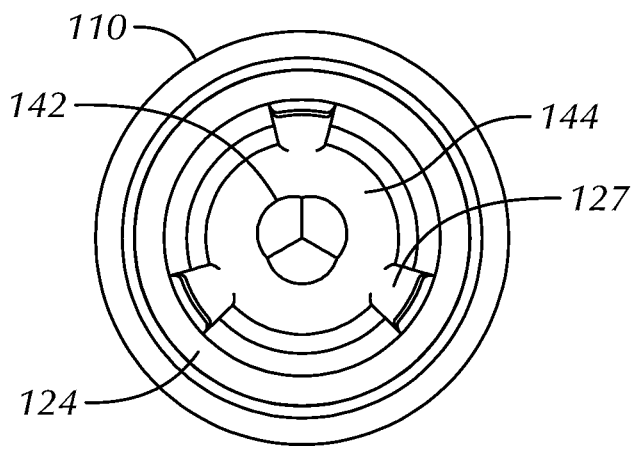
Figure 5D:
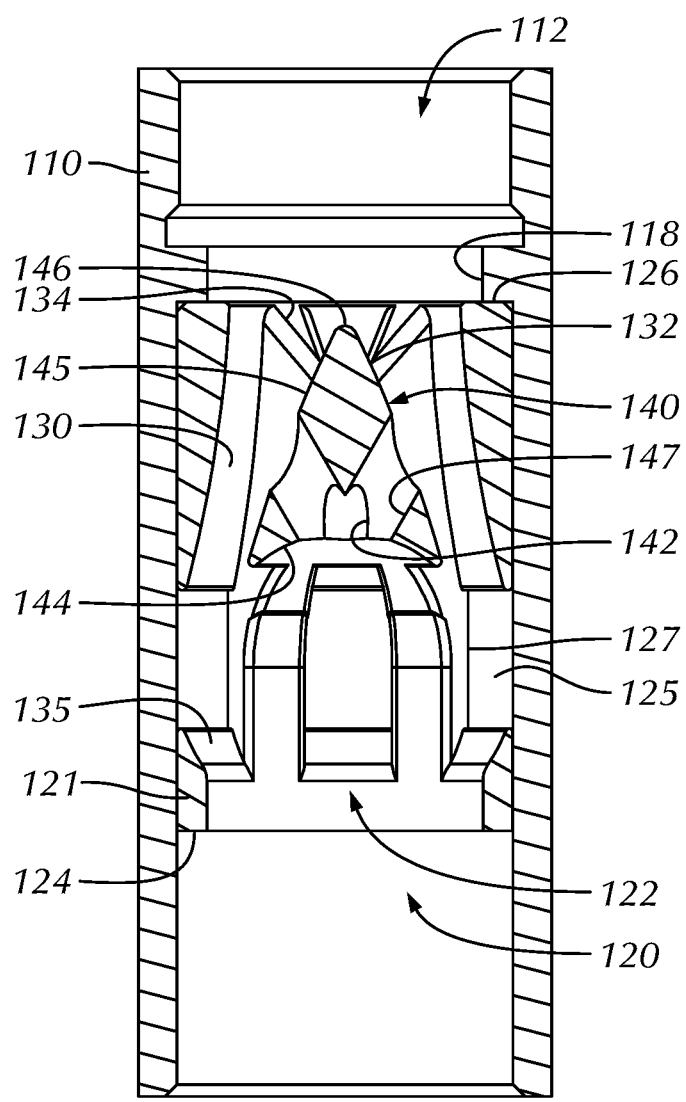
Figure 6A:
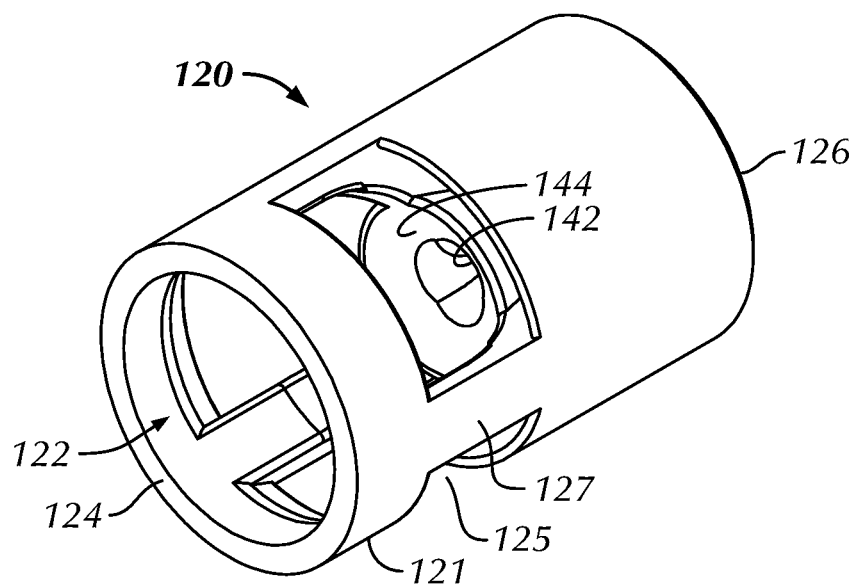
FIGS. 6A-6B illustrate perspective and sectional views of the insert.
Figure 6B:
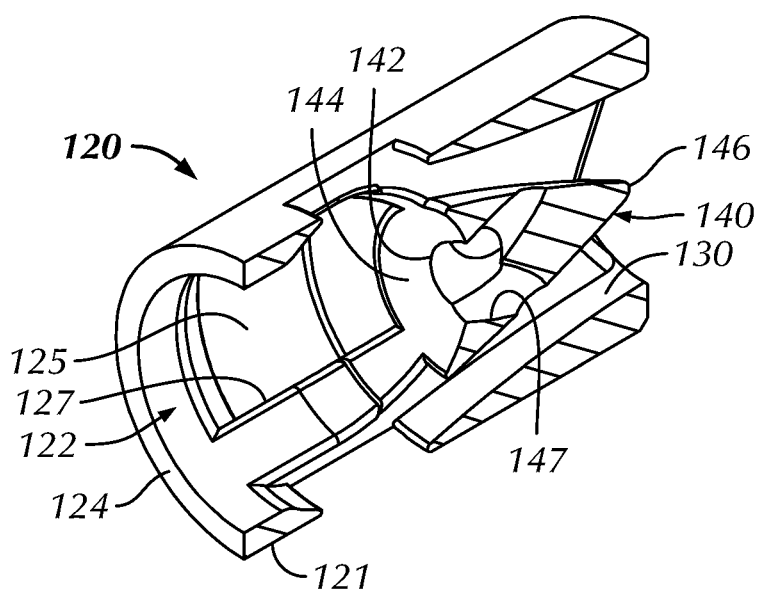

Turning additionally to FIGS. 5A-5D, the insert 120 in the housing 110 of the valve assembly 100 is illustrated in more detail in a first cross-sectional view, a top view, a bottom view, and a second cross-sectional view. FIGS. 6A-6B illustrates further perspective and sectional views of the insert 120 in isolation.

The insert's flow passage 122 defines a plurality of flutes or slots 125 in a sidewall of the insert 120. As best shown in FIGS. 6A-6B, the flutes 125 in the sidewall of the insert 120 may open the flow passage 122 external to the insert 120. This can provide additional flow area because the bore 112 of the housing 110 as shown in FIGS. 5A and 5D can acts as a wall of the insert's flow passage 122 at the open flutes 125. Other configurations may not have flutes 125 that are open in this manner.

Axial rails 127 divided by the flutes 125 connect between the ends 124, 126 of the insert 120. The rails 127 support the axial movement of the ball B, while the flutes 125 allow for flow around the ball B. The shape of the flutes 125 in combination with other aspects of the insert 120 discussed in more detail below allow shorter rails 127 than used in prior art designs. Overall, this can lead to better stability of the insert 120 in the housing 110.

Internally, the insert 120 includes a conical body 140 disposed in the flow passage 122. The conical body 140 is supported and affixed at at least one circumferential point 131 to the sidewall of the insert's flow passage 122. As best shown in FIG. 5B, three ribs 131 disposed circumferentially about the body 140 can support the body 140 to the sidewall of the insert's flow passage 122. Other configurations could have more or less ribs 131. Of course, one rib 131 could be used if the body 140 can be sufficiently supported by it.

The conical body 140 has a base 144 and has a conical side 145 that tapers from the base 144 to a tip 146. The base 144 acts as a ball stop for engaging the floating check ball (B) and faces the insert's lower end 124. The tip 146 extends away from the base 144 toward the insert's second end 126.

The sidewall of the insert's flow passage 122 converges in a first conical passage 130 from near the base 144 of the conical body 140 toward the tip 146. As best shown in FIGS.

5A and 5D, the sidewall can then diverge at a transition 132 from the first conical passage 130 away from the tip 146 of the conical body 140 into a second conical passage 134. The second conical passage 134, which is essentially formed by the upper surfaces of the ribs 131, is inverted from the first conical passage 130 and opens at the upper end 126 of the insert 120.

Figure 7A:
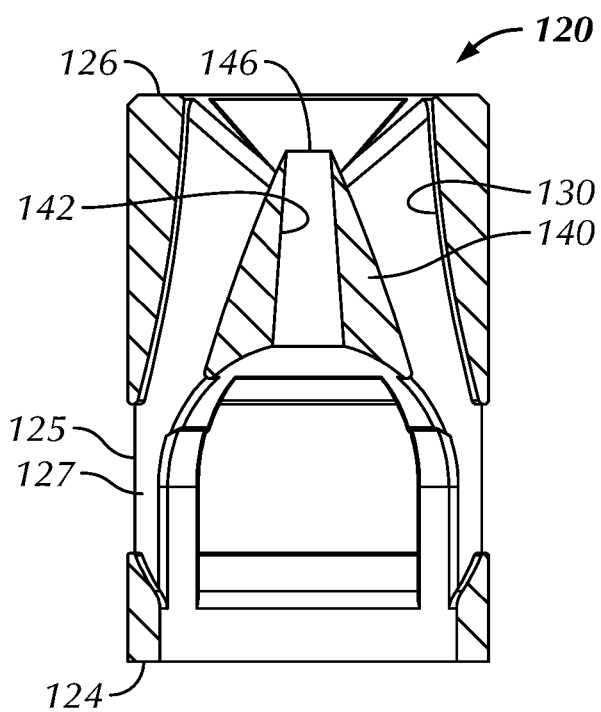
FIGS. 7A-7C illustrate cross-sectional, bottom, and perspective views of an alternative arrangement of a conical body for the insert.
Figure 7B:
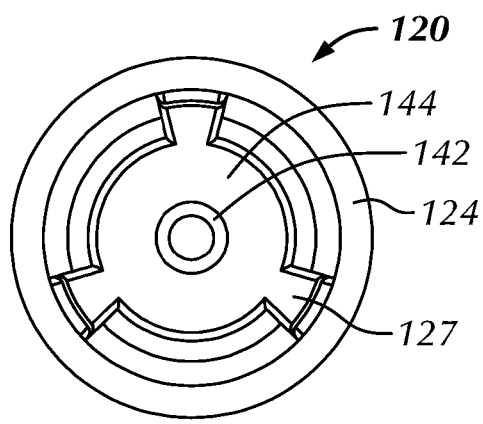
Figure 7C:
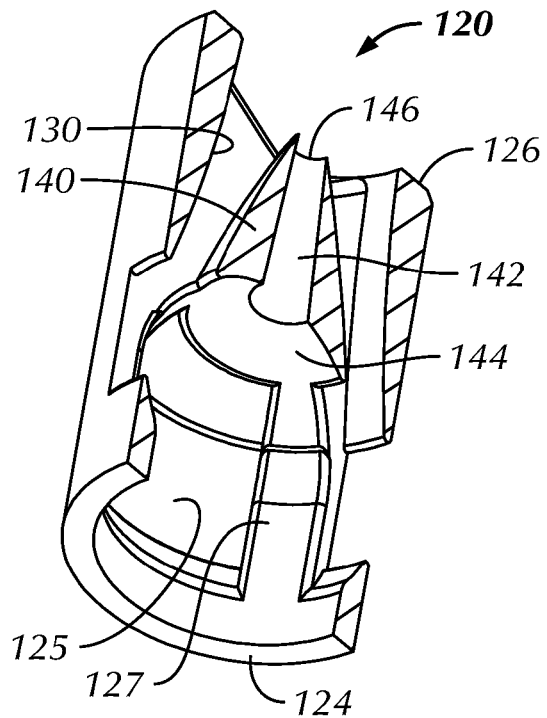
Figure 8A:
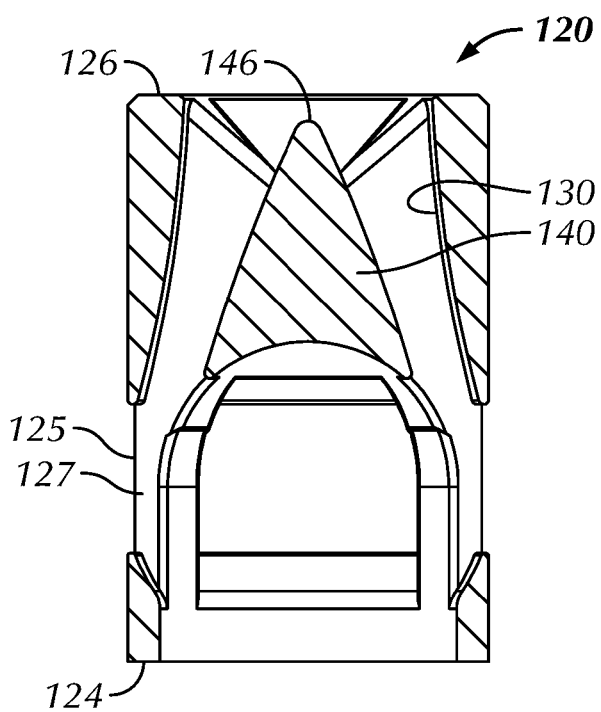
FIGS. 8A-8C illustrate cross-sectional, bottom, and perspective views of yet another alternative arrangement of a conical body for the insert.
Figure 8B:
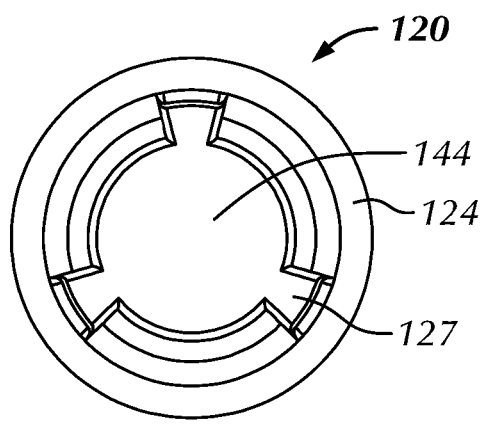
Figure 8C:
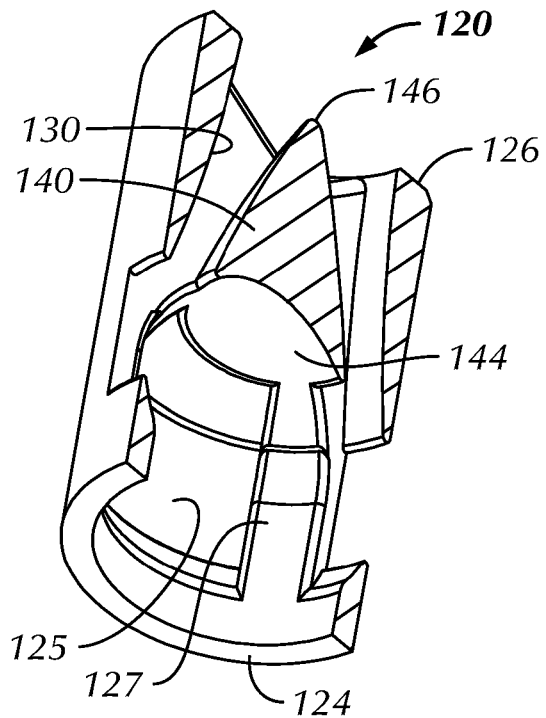

Preferably, as shown in FIGS. 4A-4C, 5A-5D, and 6A-6B, the base 144 defines a central passage or first port 142 communicating out one or more outlets or second ports 147 in the conical body 140 toward the tip 146. As shown here, the central passage 142 communicates out three outlets 147 exposed in the conical side 145 of the body 140. Briefly, other arrangements can be used for the conical body 140. For example, as shown in FIGS. 7A-7C, the conical body 140 can include a central passage 142 that communicates out the tip 146 of the body 140. Alternatively, the body 140 can be solid, such as shown in FIGS. 8A-8C.

Looking at various geometric details of the insert 120 as best shown in FIG. 4C, the base 144 of the conical body 140 preferably defines a semi-spherical surface with a radius to match the diameter $D_1$ of the floating check ball B. Additionally, the conical side 145 of the conical body 140 between the base 144 and the tip 146 can preferably be oriented tangential (as shown by line T) to a spherical surface of the floating check ball B engaged against the semi-spherical surface of the base 144.

The ring 121 defines a second diameter $D_2$ at least as great as the first diameter $D_1$ of the floating check ball B to allow for its passage to the seat 150. Edges 135 of the ring 121 can flare outward at the flutes 125 in the sidewall of the insert 120 so that the flutes 125 provide a more uniform flow area around the ball B when engaged against the base 144.

For its part, the base 144 of the conical body 140 defines a third diameter $D_3$ at least less than a fourth diameter $D_4$ from the first conical passage 130 at the end 126 of the insert 120. The third and fourth diameters $D_3$, $D_4$ may generally be less than the first diameter $D_1$ of the ball B.

As can further be seen in FIG. 4C, the sidewall of the insert 120 converges in the first conical passage 130 from a wider dimension adjacent the base 144 of the conical body 140 to a narrower dimension adjacent the tip 146. In fact, the passage 130 converges from the wider dimension $D_0$ of the housing's bore 112 exposed at the flutes 125 to the narrower dimension $D_4$ near the insert's upper end 126.

At the same time, instead of matching the slope of the body's conical side 145, the first conical passage 130 of the sidewall can diverge outward relative to the conical side 145. In this way, the first conical passage 130 can widen along the conical body 140 with increasing flow area even though the passage 130 narrows from the wider dimension $D_0$ to the narrower dimension $D_4$. The wall of the first conical passage 130 can have a uniform slope—i.e., a linear taper. Alternatively and as further shown, the first conical passage 130 may in fact have its wall diverge non-linearly or parabolically outward. The diverging of the sidewall of the first passage 130 can help increase the flow coefficient (k-factor) of the cage insert 120.

In general, the conical passage 130 and the conical body 140 provides an exit geometry that incorporates a "teardrop" shape to smooth the diverging exit path of the flow F. With the ball B stopped at the base 144, for example, the ball B and conical body 140 form an "airfoil" shape to reduce turbulence in the flow F, to reduce the pressure drop across the ball B, and to provide for more uniform flow velocity. As shown, the flow F can flow more uniformly around the ball B in the area $P_3$, which reduces turbulence, pressure drop, and excessive velocity increase.

Moreover, the insert 120 forming a nozzle-like configuration can increase the flow coefficient through the flow passage 122 and can reduce fluid drag when the ball B is stopped against the ball stop of the body's base 144. In the end, the converging and diverging surfaces provide a smooth transition of fluid flow F past the stopped ball B, both around the ball B and after the ball B. In this way, the exit geometry can reduce issues with ball chatter, cage wear, and potential gas breakout.

In the arrangement of FIGS. 4A-4C, 5A-5D, 6A-6B, and 7A-7C, the central passage 142 in the conical body 140 of the ball stop can help the floating ball B to better seat against the ball stop's surface 144. In particular and as shown in FIG. 4C, the central passage 142 in the body 140 communicating with the outlets 147 (or out the tip 146) can lead to an area $P_4$ of pressure drop behind the ball B at the stop of the base 144. It is believed that this reduction of pressure can help to further stabilize the ball B against the stop's base 144 and reduce ball chatter.

In the previous arrangements, the valve assembly 100 used an independent cage insert 120 disposed in the housing 110. This can facilitate manufacture and assembly of the valve assembly 100. For example, the housing 110 and the cage insert 120 can be manufactured separately and can be composed of different materials. For example, the housing 110 can be composed of a stainless steel, a nickel-copper alloy, MONEL® metal, or the like, while the insert 120 can be composed of a cobalt-chromium alloy, such as a STELLITE® material, to provide hardness for supporting and engaging the ball B. The housing 110 and insert 120 can be manufactured separately and used interchangeably with various balls B and seats 150 for incorporation into components of a downhole pump.

Figure 9:
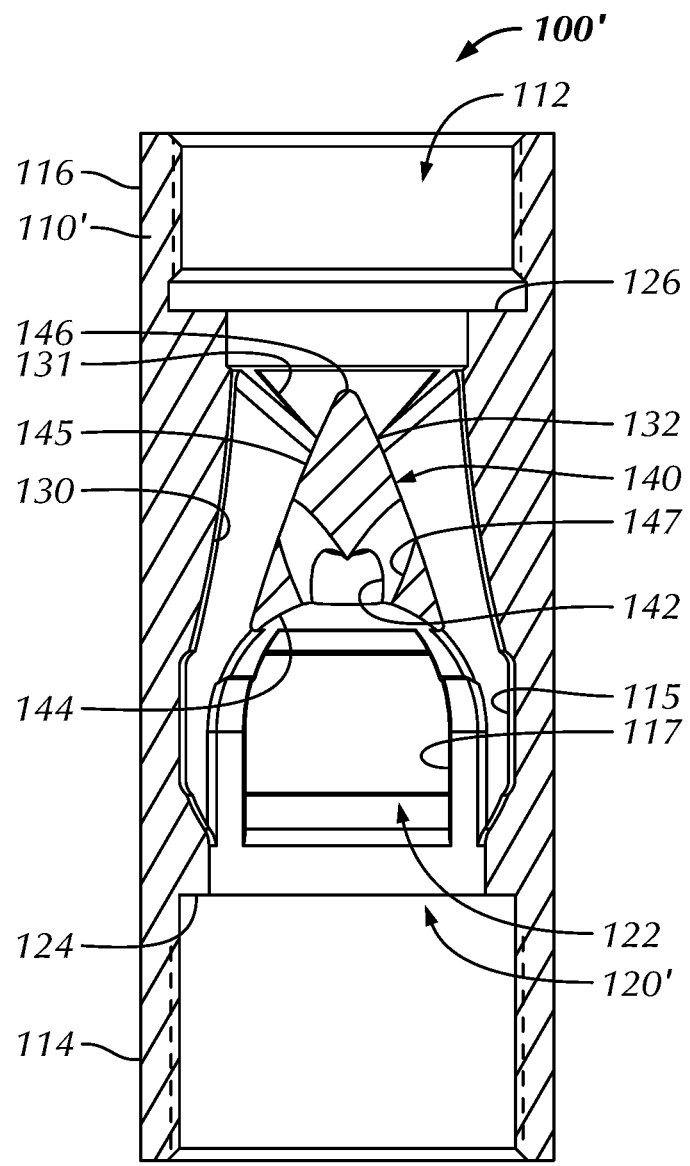
FIG. 9 illustrates a cross-sectional view of another valve assembly according to the present disclosure.

Alternatively, a valve assembly of the present disclosure can include features discussed above that are instead incorporated into an integral cage of a housing. For example, FIG. 9 illustrates a cross-sectional view of another valve assembly 100' having an integral cage 120' according to the present disclosure incorporated into a housing 110'. Features of the housing 110' and the internal cage 120' in FIG. 9 are similar to those discussed previously so like reference numerals are used. For the purposes of full explanation, some of the details may be repeated again.

As before, the valve assembly 100' is used with a floating check ball (not shown) and a ball seat (not shown) for a downhole pump. Again, the assembly 100' includes the housing 110', which has first and second ends 114, 116 and defines a flow bore 112 therethrough. As is typical, the ends 114, 116 have threads for threading to other components of the pump assembly. As shown here, the ends 114, 116 include box threads, but either one or both could be pin threads depending on the location of the valve assembly 100'.

The ball seat (not shown) is disposed in the bore 112 of the housing 110' adjacent the lower end 124 of the integral cage 120'. The floating check ball (not shown) is movably disposed in the bore 112 of the housing 110', is engagable with the ball stop in the integral cage 120', is passable at least partially through the ball passage 122 of the integral cage 120', and is seatable in the ball seat (not shown).

A conical body 140 is disposed in the bore 112 toward the second end 116 and is supported and affixed at at least one point to the sidewall of the housing 110'. Again, three ribs 131 disposed circumferentially about the body 140 can support it to the flow passage 122. Other configurations could have more or less of such ribs 131. Of course, one rib 131 could be used if the body 140 can be sufficiently supported by it.

The conical body 140 has a base 144 and a tip 146. The base 144 acts as a ball stop for engaging the floating check ball (not shown) and faces the lower end 124. The tip 146 extends away from the base 144 toward the upper end 126 of the integral cage 120'. Preferably, the base 144 of the conical body 140 defines a semi-spherical surface with a radius to match the diameter of the floating check ball (not shown). Additionally, a conical side 145 of the conical body 140 between the base 144 and the tip 146 can be oriented tangential to a spherical surface of the floating check ball (not shown) engaged against the semi-spherical surface of the base 144.

The conical body 140 can be solid in a manner similar to that of FIGS. 8A-8C. Preferably, as shown in FIG. 9, however, the base 144 defines a central passage 142 communicating out one or more outlets 147 in the conical side 145 toward the tip 146 of the conical body 140 in a manner similar to that of FIGS. 4A-4C, 5A-5D, 6A-6B, and 7A-7C. As noted above, this can help to keep the ball (not shown) engaged against the base 144 by forming lower pressure behind the engaged ball.

As shown in FIG. 9, the sidewall of the housing's bore 112 converges in a first conical passage 130' from near the base 144 of the conical body 140 toward the tip 146. The sidewall can diverge at a transition (not labelled) from the first conical passage 130 away from the tip 146 of the conical body 140 in a second, inverted conical passage (not labelled), which opens at the second end 126 of the integral cage 120'.

The first conical passage 130 of the sidewall can diverge outward relative to the side 145 of the conical body 140 from the base 144 toward the tip 146. In this way, the first conical passage 130 can widen along the body 140 with increasing flow area. The wall of the first conical passage 130 can have a uniform slope. Alternatively and as further shown, the first conical passage 130 may have its wall diverge parabolically outward.

The flow bore 112 can define a plurality of flutes or slots 115 in a sidewall of the housing 110'. As shown, the flutes 115 can provide additional flow area around the ball (not shown) when engaged with the stop of the base 144. Axial rails 117 are divided by the flutes 115. The axial rails 117 can support the movement of the ball (not shown), while the flutes 115 allow for flow around the ball (not shown).

The housing 110' with the internal cage 120' can be composed of the same material, such as a stainless steel, a nickel-copper alloy, MONEL® metal, or the like. The rails 117 and even the stop base 144 can be lined with a cobalt-chromium alloy, such as a STELLITE® material, to provide hardness for supporting and engaging the ball. A welding process, such as tungsten inert gas (TIG) welding, is used to line the hardening alloy on the surfaces.

According to the various arrangements of the present disclosure, the cage insert 120/integral cage 120' is configured to reduce ball chatter and reduce gas breakout by reducing turbulence and pressure drop. The features are designed to stabilize the ball B by having more equalized pressure drop across the ball B, reducing the velocity of the flow, and making the flow more laminar and less turbulent.

Gas breakout may be more of an issue for the standing valve 90B of the downhole pump 70 as in FIG. 3 because gas in the barrel chamber can lead to gas lock and reduced fluid production. Once fluid has passed through the traveling valve 90A, however, the fluid can be produced so gas breakout may be less of an issue for the traveling valve 90A. All the same, one or both of the traveling and standing valves 90A-B may use the disclosed features of insert 120/integral cage 120'. Either way, the flow through the valve assembly 100/100' sees a more uniform area around the ball B, and the flow also has a more constant velocity profile, which can reach smaller velocities that produced in the prior art cage. This can reduce gas breakout.

The housing 110' with the integral cage 120' of FIG. 9 can be manufactured using machining, hard surfacing, and other manufacturing steps. The separate insert 120 of FIGS. 4A through 8C can be manufactured using 3-D printing, investment casting, or other manufacturing steps. Preferably, the insert 120 is investment cast out of cobalt-chromium alloy, such as a STELLITE® material, and the prepared insert 120 can then be disposed in the housing 110 for incorporation into a downhole pump. The insert 120 can be held captive in the housing 110 using the internal shoulder, threaded components, brazing, soldering, friction welding, or the like.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A valve assembly used with a floating check ball for a downhole pump, the floating check ball having a first diameter, the assembly comprising:
  a housing disposed on the pump and defining a bore therethrough;
  an insert disposed in the bore of the housing, the insert having first and second ends and defining a flow passage therethrough, the flow passage defining a plurality of flutes in a sidewall of the insert; and
  a conical body of the insert disposed in the flow passage and affixed at at least one point to the sidewall, the conical body comprising:
   a base facing the first end for engaging the floating check ball,
   a tip extending away from the base toward the second end of the insert, and
   a conical side tapering from the base to the tip,
  the sidewall of the insert converging in a first conical passage from a wider dimension adjacent the base of the conical body to a narrower dimension adjacent the tip,
  the sidewall diverging at a transition from the first conical passage away from the tip of the conical body in a second conical passage, the second conical passage being inverted from the first conical passage and opening at the second end of the insert.

2. The assembly of claim 1, wherein the base of the conical body defines a semi-spherical surface.

3. The assembly of claim 2, wherein the conical side of the conical body tapering from the base to the tip is oriented to be tangential to a spherical surface of the floating check ball engaged against the semi-spherical surface of the base.

4. The assembly of claim 1, wherein the insert comprises a plurality of rails disposed between the flutes in the sidewall of the insert.

5. The assembly of claim 1, wherein the first conical passage of the sidewall diverges outward relative to the conical side of the conical body from the base toward the tip.

6. The assembly of claim 5, wherein the first conical passage diverges non-linearly outward.

7. The assembly of claim 1, wherein the first end of the insert comprises a ring defining a ball opening for passage of the floating check ball.

8. The assembly of claim 7, wherein the ring defines a second diameter at least as great as the first diameter of the floating check ball.

9. The assembly of claim 7, wherein the ring flares outward at the flutes in the sidewall of the insert.

10. The assembly of claim 1, wherein the flow passage at the second end defines a second diameter at least as great as a third diameter of the base of the conical body.

11. The assembly of claim 10, wherein the second and third diameters are less than the first diameter of the floating check ball.

12. The assembly of claim 1, wherein the base defines a first port communicating with one or more second ports in the conical body.

13. The assembly of claim 1, wherein one end of the housing defines first threads for threading to a first component of the downhole pump; and wherein another end of the housing defines second threads for threading to a second component of the downhole pump.

14. The assembly of claim 1, further comprising:
a ball seat disposed in the bore of the housing adjacent the first end of the insert,
wherein the floating check ball is movably disposed in the bore of the housing, engagable with the base of the conical body, passable at least partially through the ball passage of the insert, and seatable in the ball seat.

15. A downhole pump for a reciprocating pump system having a rod string disposed in a tubing string, the pump comprising:
a barrel disposed in the tubing string and having a standing valve; and
a plunger coupled to the rod string and movably disposed in the barrel, the plunger having a traveling valve,
wherein at least one of the standing and traveling valves uses a floating check ball and a ball seat and comprises a valve assembly according to claim 1.

16. The assembly of claim 1, wherein the housing comprises a tubular having a cylindrical passage; and wherein the insert comprises a cylindrical body separate from the tubular and disposed in the cylindrical passage.

17. The assembly of claim 16, wherein the flutes in the sidewall of the insert open the flow passage external to the insert through openings defined in the outer wall of the cylindrical body.

18. The assembly of claim 16, further comprising a ball seat disposed in the cylindrical passage of the tubular, wherein the ball seat abuts against the first end of the cylindrical body of the insert or abuts against an opposite side of a shoulder against which the first end of the cylindrical body of the insert abuts.

19. The assembly of claim 1, wherein the insert is integral to the housing.

20. A valve assembly used with a floating check ball for a downhole pump, the assembly comprising:
a housing disposed on the pump, the housing having first and second ends and defining a bore therethrough;
a plurality of flutes disposed toward the first end of the housing and defined in a sidewall of the bore of the housing; and
a conical body disposed in the bore toward the second end and affixed at at least one point to the sidewall of the housing, the conical body comprising:
a base facing the first end for engaging the floating check ball,
a tip extending away from the base toward the second end of the insert, and
a conical side tapering from the base to the tip,
the sidewall of the housing converging in a first conical passage from a wider dimension adjacent the base of the conical body to a narrower dimension adjacent the tip,
the sidewall diverging at a transition from the first conical passage away from the tip of the conical body in a second conical passage, the second conical passage being inverted from the first conical passage and opening at the second end of the housing.

21. The valve assembly of claim 20, further comprising:
a barrel disposed in a tubing string for a reciprocating pump system, the barrel having a standing valve; and
a plunger coupled to a rod string for the reciprocating pump system and movably disposed in the barrel, the plunger having a traveling valve,
wherein at least one of the standing and traveling valves comprises the valve assembly according to claim 20.

22. The assembly of claim 20, wherein the housing comprises:
a tubular; and
an insert disposed in the tubular and defining a flow passage therethrough,
wherein the conical body as part of the insert is disposed in the flow passage.

23. The assembly of claim 22, wherein the housing comprises the tubular and the insert as separate components.

24. The assembly of claim 23, wherein the flutes comprise side openings defined in an outer wall of the insert, the side openings exposing the second flow passage of the insert to an inner wall of the tubular.

25. The assembly of claim 22, wherein the housing comprises the tubular and the insert as integral components.

* * * * *